(12) United States Patent
Tomita

(10) Patent No.: US 7,066,531 B2
(45) Date of Patent: Jun. 27, 2006

(54) CHASSIS STRUCTURE FOR VEHICLES

(75) Inventor: Tatsuzo Tomita, Ohbu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/959,119

(22) Filed: Oct. 7, 2004

(65) Prior Publication Data
US 2005/0077754 A1 Apr. 14, 2005

(30) Foreign Application Priority Data
Oct. 8, 2003 (JP) ............................. 2003-349917

(51) Int. Cl.
*B60K 7/00* (2006.01)
(52) U.S. Cl. ...................... 296/187.03; 296/198.09; 180/68.5
(58) Field of Classification Search .......... 296/187.03, 296/187.09, 187.11, 203.02; 280/784; 180/299, 180/68.5
See application file for complete search history.

(56) References Cited

U.S. PATENT DOCUMENTS

| | | | | |
|---|---|---|---|---|
| 3,819,219 A | * | 6/1974 | Parner ........................ 293/134 |
| 3,848,886 A | * | 11/1974 | Feustel .................. 296/187.09 |
| 3,912,295 A | * | 10/1975 | Eggert, Jr. .................. 280/784 |
| 4,045,009 A | * | 8/1977 | Pees ........................... 293/134 |
| 5,431,445 A | * | 7/1995 | Wheatley ................ 296/187.03 |
| 6,113,178 A | * | 9/2000 | Faigle .................... 296/187.06 |
| 6,186,574 B1 | * | 2/2001 | Motozawa et al. ......... 296/68.1 |
| 6,367,869 B1 | * | 4/2002 | Baccouche et al. ..... 296/187.09 |
| 6,398,292 B1 | * | 6/2002 | Tsuruta et al. ......... 296/187.09 |
| 6,808,229 B1 | * | 10/2004 | Yamaguchi ............ 296/203.02 |
| 6,820,924 B1 | * | 11/2004 | Caliskan et al. ....... 296/187.03 |
| 6,824,168 B1 | * | 11/2004 | Kawazu et al. ............. 280/784 |

FOREIGN PATENT DOCUMENTS

JP    10-129522 A    5/1998
JP    2000-229581 A   8/2000

* cited by examiner

*Primary Examiner*—Kiran B. Patel
(74) *Attorney, Agent, or Firm*—Birch, Stewart, Kolasch & Birch, LLP

(57) ABSTRACT

It is an object of the invention to provide a chassis structure for vehicles that can effectively absorb an impact. Side members extend in a longitudinal direction of a vehicle body along the sides of the vehicle body. The side members are made to buckle in the longitudinal direction upon receiving an impact. A cross member extends between the side members along the width direction of the vehicle body. Coupling rods are supported by the side members via support members. The cross member is fixed to tips of the coupling rods by bolts. When an impact exceeding a predetermined level is exerted on the cross member in the longitudinal direction, the support members are broken, whereby the cross member and coupling rods are detached from the side members.

10 Claims, 9 Drawing Sheets

CHASSIS STRUCTURE FOR VEHICLES

CROSS-REFERENCE TO RELATED APPLICATIONS

This application is based upon and claims the benefit of priority from prior Japanese Patent Application No. 2003-349917, filed Oct. 8, 2003, the entire contents of which are incorporated herein by reference.

BACKGROUND OF THE INVENTION

1. Field of the Invention

The present invention relates to a chassis structure for vehicles, and more particularly to a structure in which a cross member is attached to side members that provide part of a chassis.

2. Description of the Related Art

In vehicles, there is a demand for effective reduction of an impact exerted thereon when a collision occurs. To absorb an impact exerted on a vehicle from the front, for example, the front portions of side members, which are included in the chassis of the vehicle and extend in the longitudinal direction of the vehicle, are designed to easily buckle upon receiving the impact. This buckling portion is called a crushable zone.

Further, a structure is known in which a cross member, which is included in the chassis and to which a steering device, for example, is attached, is extended between the side members. Jpn. Pat. Appln. KOKAI Publication No. 2000-229581 (FIG. 2) discloses a structure in which a cross member is fixed to side members by bolts inserted through holes formed in the bottom of side members and the corresponding upper portions of a cross member. In this case, the bolts are inserted through the holes from above the side members and secured to the side members, and then nuts are attached from below the cross member. Further, Pat. Appln. KOKAI Publication No. 10-129522 (FIG. 2) discloses a structure in which brackets are provided on side members, and a cross member is secured to the side members via the brackets. In this case, bolts are inserted from above the brackets, and nuts are attached from below the cross member.

In front-engine front-wheel-drive (FF) or front-engine rear-wheel-drive (FR) vehicles, the engine is located before the cross member within the crushable zone formed by the side members. In this structure, if an impact is exerted on a vehicle from the front upon head-on collision, the portions of the side members located before the engine buckle firstly. When the buckling motion of the side members advances up to the front end of the engine, the impact is transmitted to the engine. Since the engine is rigid, it is moved backward without being crushed. When the buckling motion of the side member further advances, the rear end of the engine collides with the cross member. As a result, the buckling motion of the side members is suppressed. Thus, the cross member interrupts the buckling of the side members, which means that the crushable zone of the size members is not sufficiently utilized.

BRIEF SUMMARY OF THE INVENTION

The present invention has been developed in light of the above problem, and aims to provide a chassis structure capable of effectively absorbing an impact exerted from the front.

A chassis structure for vehicles according to the invention comprises:

a pair of side members extending in a longitudinal direction of a vehicle body along sides of the vehicle body, the side members buckling in the longitudinal direction upon receiving an impact;

a cross member extending between the side members along a width direction of the vehicle body; and a coupling structure which couples the cross member to the side members, the coupling structure permitting the cross member to be detached from the side members when an impact exceeding a predetermined level is exerted on the cross member in the longitudinal direction.

The chassis structure of the invention is constructed such that when a significant impact is exerted on the cross member upon a collision, the cross member is detached from the side members. Accordingly, the buckling motion of the side members is not interrupted by the cross member, therefore the side members can sufficiently absorb the impact.

Preferably, the coupling structure comprises:

a coupling rod;

a support unit fixed to each of the side members and supporting the coupling rode; and a fastening tool fixing the cross member to a tip of the coupling rod, said support unit being broken when said impact is exerted on the cross member, thereby releasing the coupling rod and permitting the cross member to be detached from the side members.

By virtue of the coupling structure constructed as above, the level of an impact that drops the cross member can be adjusted by selecting the configuration and material of the support unit. That is, the cross member can be detached without using a complex releasing mechanism.

More preferably, the support unit comprises:

a first support plate fixed to each of the side members and holding the coupling rod near the cross member, the first support plate being deformed in accordance with a change in an attitude of the coupling rod when said impact is exerted on the cross member, thereby releasing the coupling rod; and a second support plate fixed to each of the side members and holding the coupling rod near said each side member, the second support plate being deformed in accordance with the change in the attitude of the coupling rod when said impact is exerted on the cross member, thereby releasing the coupling rod.

By virtue of the support unit constructed as above, the cross member can be reliably supported by the side members. Further, the level of an impact that drops the cross member can be adjusted by selecting the configurations and materials of the first and second support plates.

In accordance with an embodiment of the invention:

the coupling rod has an inside screw formed in an end thereof;

the fastening tool is a bolt engaged with the inside screw; and a through hole through which the fastening fool extends is formed in the first support plate, the through hole being forcibly expanded by the coupling rod or the fastening fool when said impact is exerted on the cross member, thereby releasing the coupling rod from the first support plate.

In the above case, preferably, the second support plate is fixed to a surface of each of the side members remote from the cross member, the second support plate being broken when said impact is exerted on the cross member, thereby releasing the coupling rod from the second support plate.

Preferably, the second support plate is formed of a more elastically deformable material than a material of the side members.

Preferably, the coupling rod is welded to the second support plate.

Preferably, the chassis structure of the invention further comprises a reinforcing member attached to a surface of each of the side members behind the coupling rod and remote from the cross member, the reinforcing member reinforcing said each side member.

The reinforcing member attached to each side member enables an impact to be effectively transmitted to the support unit to thereby accelerate the deformation or breakage of the support unit.

In accordance with an embodiment of the invention:

the side members each have a slanting portion that backwardly lowers; and the cross member is coupled to the side members below the slanting portion.

By virtue of constructing the side members and cross member as above, when a significant impact is exerted on the cross member upon a collision, the cross member can be promptly detached from the side members.

In this case, preferably, the side members each have a horizontal portion extending after the slanting portion; and the reinforcing member reinforces an angled portion extending between the slanting portion and the horizontal portion.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Embodiment 1

Referring first to FIGS. 1 to 8, a chassis structure for vehicles according to a first embodiment of the invention will be described.

Figure 1:
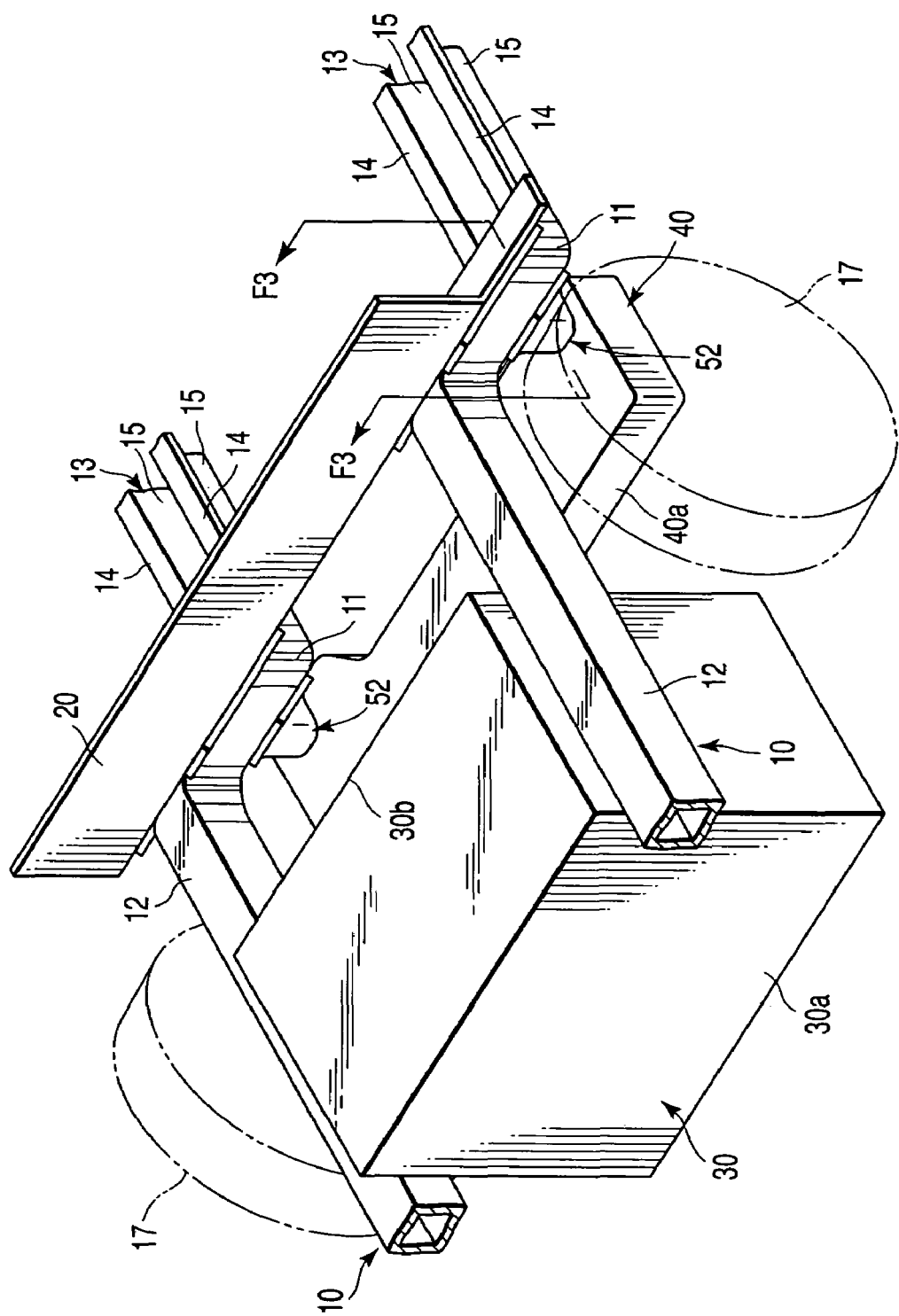
FIG. 1 is a perspective view illustrating the outline of the front portion of a chassis structure according to a first embodiment of the invention.

FIG. 1 shows the front portion of a chassis structure for, for example, front-engine front-wheel-drive (FF) vehicles according to the first embodiment. In FIG. 1, reference 10 denotes side members extending in the longitudinal direction of a vehicle body. A dashboard 20 is extended between and secured to the side members 10. The side members 10 each have a slanting portion 11 backwardly lowered, on which the dashboard 20 is mounted. The portion of each side member 10 located before the slanting portion 11 will hereinafter be referred to as "the front portion 12", while the portion of each side member 10 located behind the slanting portion 11 will hereinafter be referred to as "the rear portion 13".

The front portion 12 has, for example, a substantially rectangular cross section, and is arranged to buckle upon receiving an impact exceeding a predetermined level, which is exerted from the front, thereby absorbing it. In other words, the front portion 12 provides a crushable zone. An engine 30 is located between the front portions 12 of the side members 10. The slanting portion 11 and rear portion 13 have, for example, a configuration including flanges 14 outwardly extending from the upper ends of respective side walls 15, and the dashboard 20 or a floor panel (not shown) is mounted thereon. In FIG. 1, reference numeral 17 denotes front wheels.

In FIG. 1, reference numeral 40 denotes a cross member located just behind the engine 30 and coupled to the lower ends of the slanting portions 11 of the side members 10. Thus, the cross member 40 extends between the side members 10. The cross member 40 is, for example, a hollow member, and is attached to, for example, a steering device (not shown).

The engine 30 comprises a cylinder block, cylinder head, etc. The engine 30 is formed rigidly and hence little deforms even if the vehicle has a collision. Accordingly, when an impact is exerted from the front on the vehicle body, the engine 30 is moved backward and brought into contact with the cross member 40 in accordance with the buckling motion of the front portions 12 of the side members 10. At this time, in the conventional structure, the buckling motion of the side members 10 is interrupted by the engine 30. To avoid this, in the chassis structure of the present invention, the coupling portions of the cross member 40 and side members 10 are designed so that the cross member 40 is detached from the side members 10 when an impact exceeding a predetermined level is exerted from the front.

Figure 2:
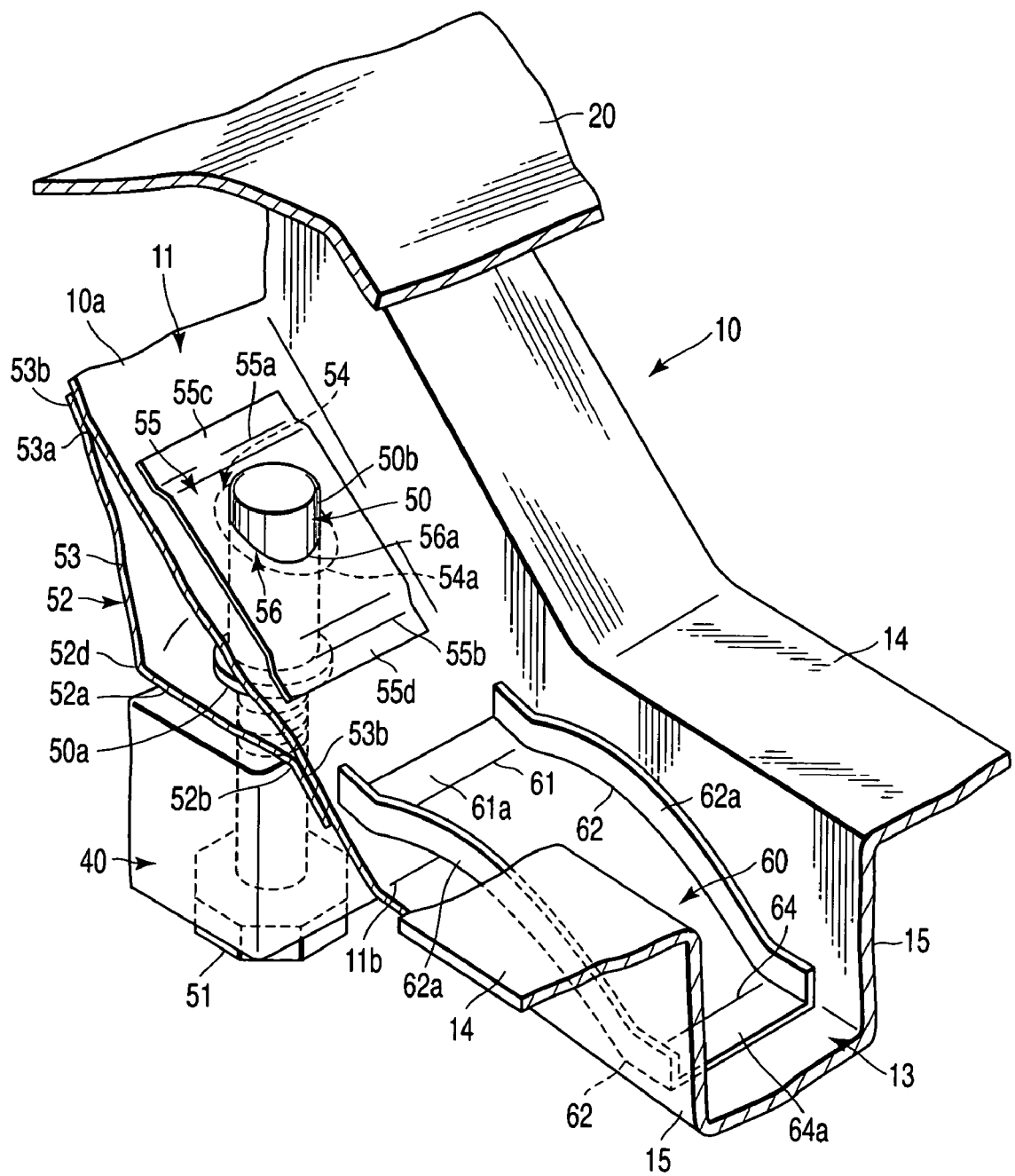
FIG. 2 is a perspective view illustrating the structure, employed in the embodiment, in which a cross member is coupled to side members.

FIG. 2 shows a structure in which the cross member 40 is attached to the slanting portions 11. As shown, the cross member 40 is coupled to the slanting portions 11 of the side members 10 via respective coupling rods 50 and bolts 51 (fastening tools). Since the same coupling structure is employed for both the side members 10, a description will be given of only the left side member 10.

The coupling rod 50 is a tubular member, and an inside screw is formed in the lower portion of its inner peripheral wall. Respective through holes 40b are formed in the bottom and upper wall of the cross member 40. The bolt 51 is inserted from below through the cross member 40 via the through holes 40b, and coupled to the low portion of the coupling rod 50 via a through hole 52e, described later.

Figure 3:
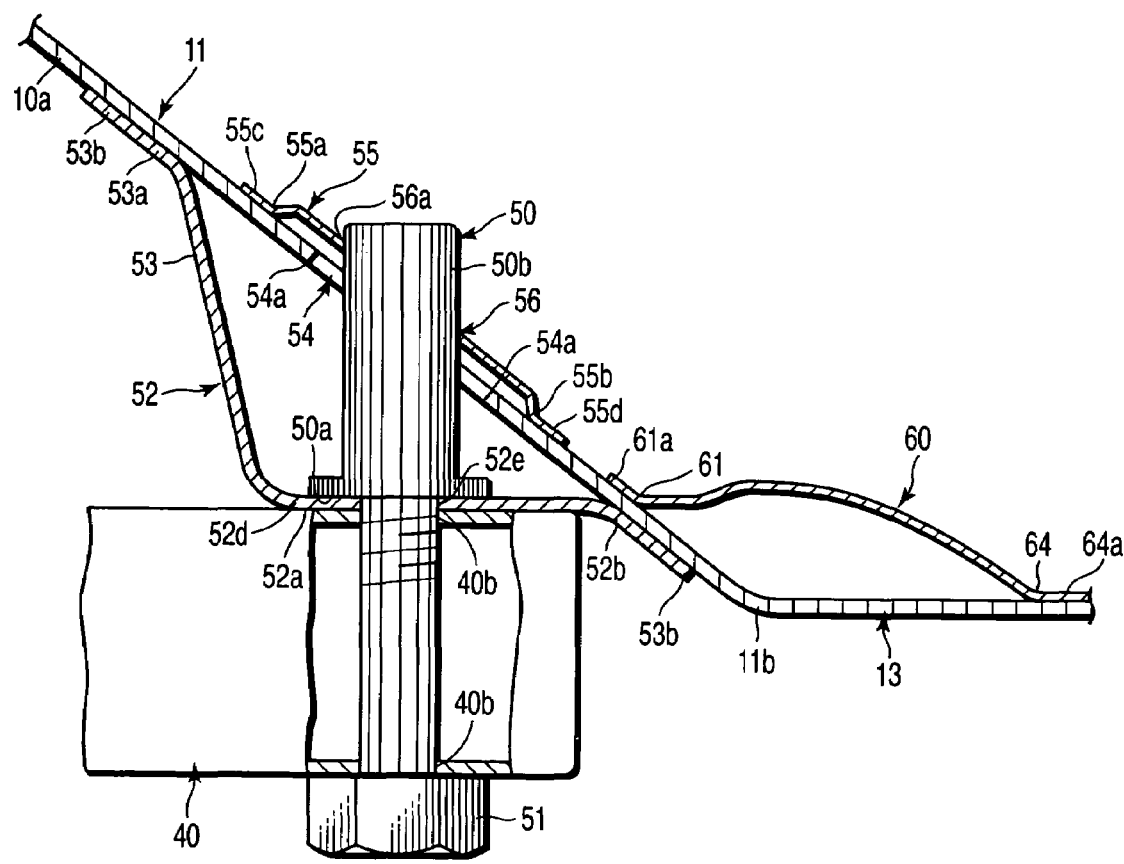
FIG. 3 is a sectional view taken along line F3—F3 in FIG. 1.

As seen from FIG. 3, a first support plate 52 is attached to the lower surface of the bottom 10a of the slanting portion 11 of the side member 10. The first support plate 52 has a bottom 52a extending horizontally in the forward/backward direction and supporting the bottom 50a of the coupling rod 50. The coupling rod 50 is welded to, for example, the bottom 52a of the first support plate 52 to a degree that enables the bottom 50a to be fixed in position. The bottom 52a has the above-mentioned through hole 52e through which the bolt 51 is inserted.

The rear end 52b of the bottom 52a contacts the lower surface of the bottom 10a of the slanting portion 11. The peripheral edge 52d in the bottom 52a is, for example, substantially rectangular and has obtuse corners. The first support plate 52 further includes a side wall 53 extending from the peripheral edge 52d toward the lower surface of the bottom 10a of the slanting portion 11. The side wall 53 and bottom 52a have ends 53a and 52b, respectively, that contact the lower surface of the bottom 10a and include respective flanges 53b extending over the bottom 10a in the width direction of the bottom 10a. The flanges are secured to the bottom 10a by, for example, welding.

The first support plate 52 is formed of a material that is more elastically deformable than the side member 10, so that it can absorb vibration or load occurring between the side members 10 and cross member 40. However, to secure sufficient durability and steering stability, the first support plate 52 has a predetermined thickness that provides the plate with rigidity sufficient for running.

The length of the coupling rod 50 is greater than the vertical distance between the bottom 52a of the first support plate 52 and the bottom 10a of the slanting portion 11. Therefore, a through hole 54 is formed in the bottom 10a of the slanting portion 11, through which the upper portion 50b of the coupling rod 50 is inserted. As will be described later, the through hole 54 has a size that provides a sufficient clearance between its edge 54a and the coupling rod 50.

A second support plate 55 that supports the upper portion 50b of the coupling rod 50 is attached to the upper surface of the bottom 10a of the slanting portion 11. The second support plate 55 is, for example, a cover plate that covers the through hole 54 from above. The second support plate 55 has angled front and rear ends 55a and 55b, and an upwardly projecting central portion. The front end 55a includes a flange 55c forwardly extending along the upper surface of the bottom 10a of the slanting portion 11. Similarly, The rear end 55b includes a flange 55d extending rearward along the upper surface of the bottom 10a of the slanting portion 11. The flanges 55c and 55d are secured, by, for example, welding, to the upper surface of the bottom 10a of the slanting portion 11.

A through hole 56 that passes therethrough the upper portion 50b of the coupling rod 50 is formed in the second support plate 55 at a location corresponding to the upper portion 50b. The edge 56a of the through hole 56 completely contacts the periphery of the upper portion 50b of the coupling rod 50. The upper portion 50b of the coupling rod 50 is fixed to the edge 56a of the through hole 56 by, for example, arc welding, with the result that the coupling rod 50 is supported by the side member 10 via the second support plate 55.

Figure 4:
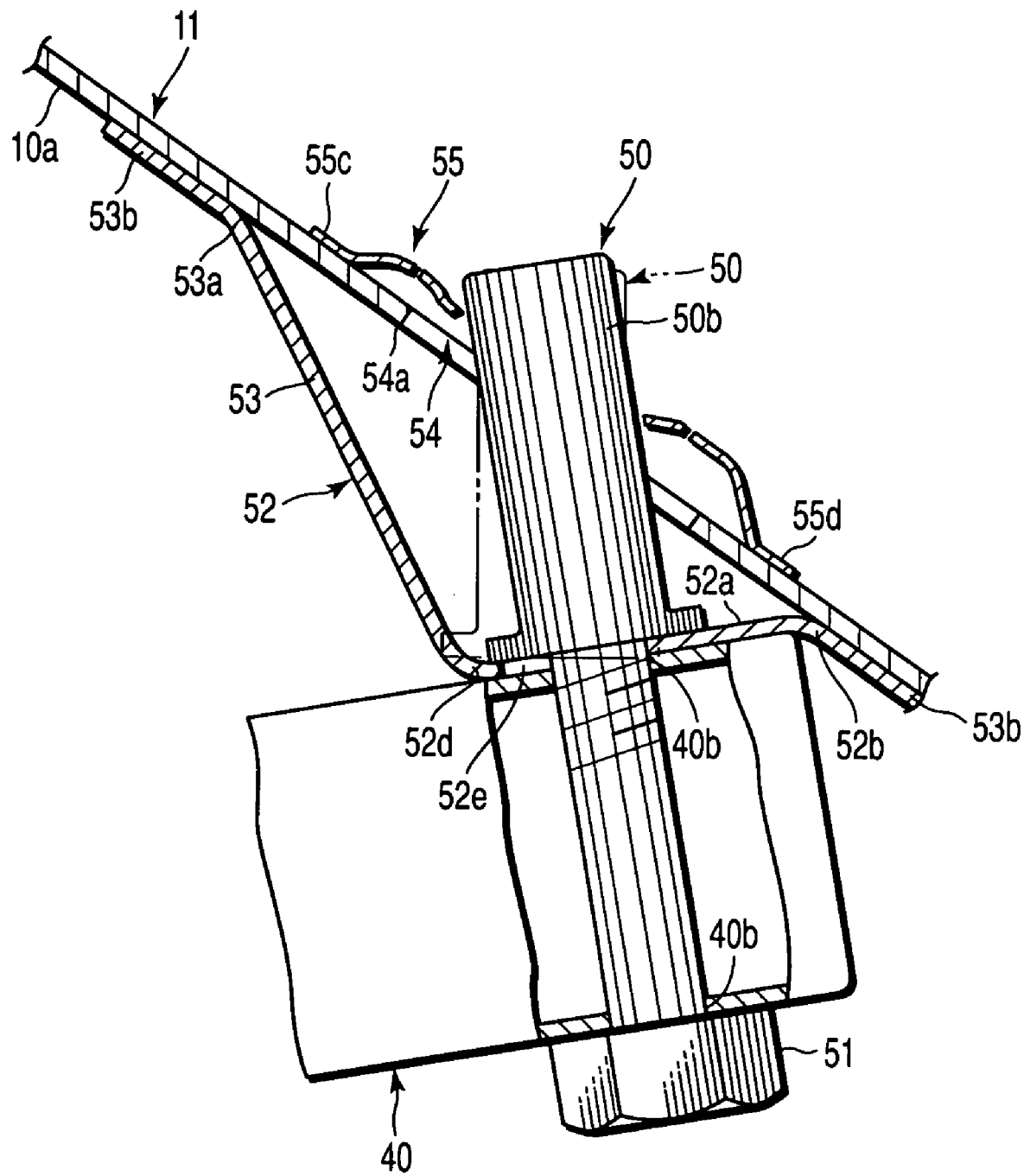
FIG. 4 is a sectional view illustrating a state of the coupling portion of the cross member assumed when significant impact is exerted on the cross member from the front.

In FIG. 3, if a significant impact is exerted on the cross member 40 from the front, the first support plate 52 is deformed to vary the attitude of the coupling rod 50. When the attitude of the coupling rod 50 is greatly varied, the second support plate 55 cannot absorb the attitude change of the coupling rod 50 and hence will be broken, i.e., the welded portion of the edge 56a will be separated, as is shown in FIG. 4. As a result, the coupling rod 50 is released from the second support plate 55. The level of an impact that releases the coupling rod 50 can be adjusted by adjusting the strength of the second support plate 55. The through hole 54 of the side member 10 has a size that permits a certain change in the attitude of the coupling rod 50. In FIG. 4, the two-dot chain line indicates the original attitude of the coupling rod 50.

Figure 5:
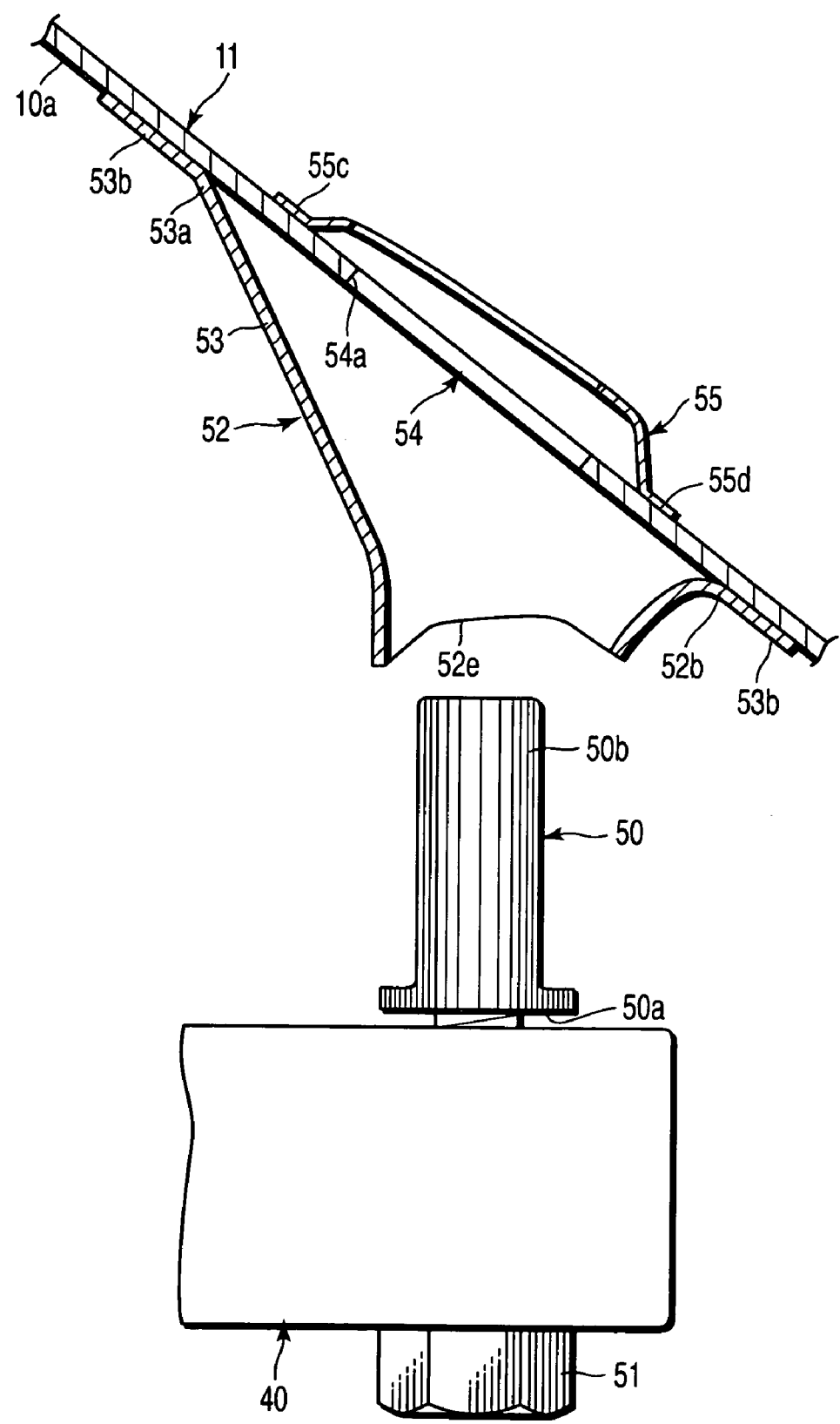
FIG. 5 is a sectional view illustrating a state in which the cross member drops from the side members, along with a coupling rod.
Figure 6:
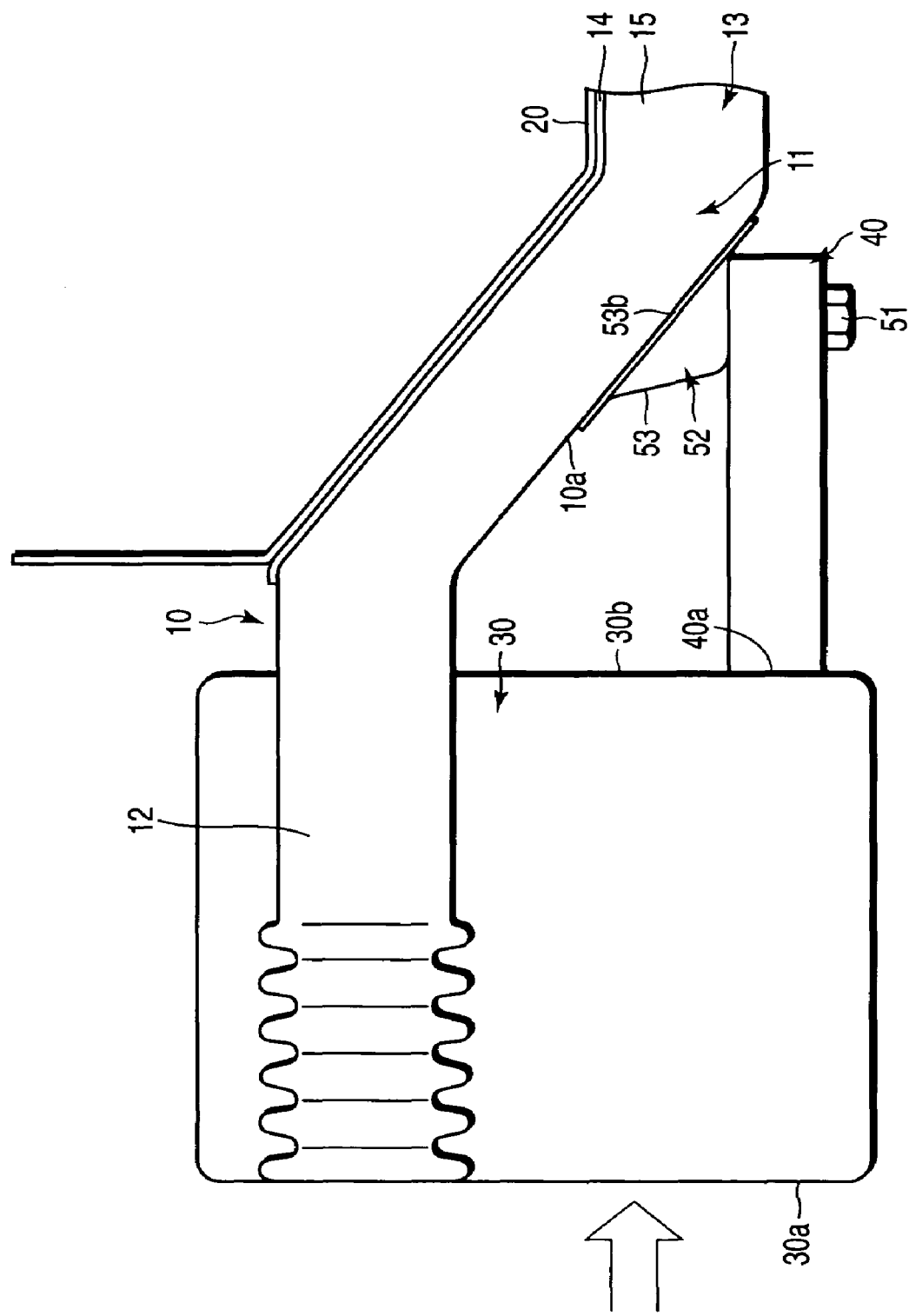
FIG. 6 is a side view illustrating a state in which an engine is moved until it is brought into contact with the front end of the cross member.

On the other hand, the first support plate 52 is constructed such that when a significant impact is exerted on the cross member 40 from the front, the plate 52 is deformed to cause the bolt 51 to break the through hole 52e in accordance with changes in the attitude of the coupling rod 50. The load of the cross member 40 released from the second support plate 55 is exerted on the broken through hole 52e, and the hole 52e is forcibly expanded by the coupling rod 50 as shown in FIG. 5, with the result that the cross member 40 and coupling rod 50 drop down together.

As shown in FIGS. 2 and 3, a reinforcing member 60 is attached to the bottom 10a of each side member 10 from the slanting portion 11 to the rear portion 13. The reinforcing member 60 is, for example, a plate smoothly curved from the front end to the rear end.

The front end 61 of the reinforcing member 60 contacts the upper surface of the bottom 10a of the slanting portion 11, and includes a flange 61a forwardly extending along the upper surface of the bottom 10a. Both sides 62 of the reinforcing member 60 located in the width-direction of the vehicle body contact the respective inner surfaces of the side walls 15 of the side member 10. Both sides 62 include respective flanges 62a upwardly extending along the inner surfaces of the side walls 15. The rear end 64 of the reinforcing member 60 contacts the upper surface of the bottom 10a of the rear portion 13, and includes a flange 64a extending rearward along the upper surface of the bottom 10a. The flanges 61a, 62a and 64a are fixed to the respective contact portions of each side member 10, by, for example, welding. This being so, the angled portion 11b of each side member 10 located between the slanting portion 11 and rear portion 13 has a high rigidity. As a result, the impact exerted on the cross member 40 is concentrated on the first and second support plates 52 and 55 instead of the angled portion 11b.

A description will now be given of the state of deformation and breakage of the chassis assumed when the vehicle collides head-on with something.

When a great impact is exerted on the side members 10 from the front, the front portions 12 of the side members 10 located before the front end 30a of the engine 30 are made to buckle up to the front end 30a of the engine 30. The impact is also exerted on the engine 30, whereby the engine 30 is moved backward. When the rear end 30b of the engine 30 has reached the front end 40a of the cross member 40 as show in FIG. 6, the impact exerted on the engine 30 is transmitted to the cross member 40.

At this time, if the impact transmitted to the cross member 30 exceeds a predetermined level, the cross member 40 is moved backward as shown in FIG. 4, thereby changing the attitude of the coupling rod 50. The second support plate 55 cannot absorb a change in the attitude of the coupling rod 50 and is therefore broken, thereby breaking the welded portion in the through hole 56. At the same time, the welded portion in the first support plate 52 is broken. Subsequently, the through hole 52e is broken in accordance with a change in the attitude of the bolt 51 caused by a change in the attitude of the coupling rod 50, and is forcibly expanded by the weight of the cross member 40. As a result, the coupling rod 50 is released from the second and first support plates 55 and 52 as shown in FIG. 5, and the cross member 40 and coupling rod 50 drop down together.

Figure 7:
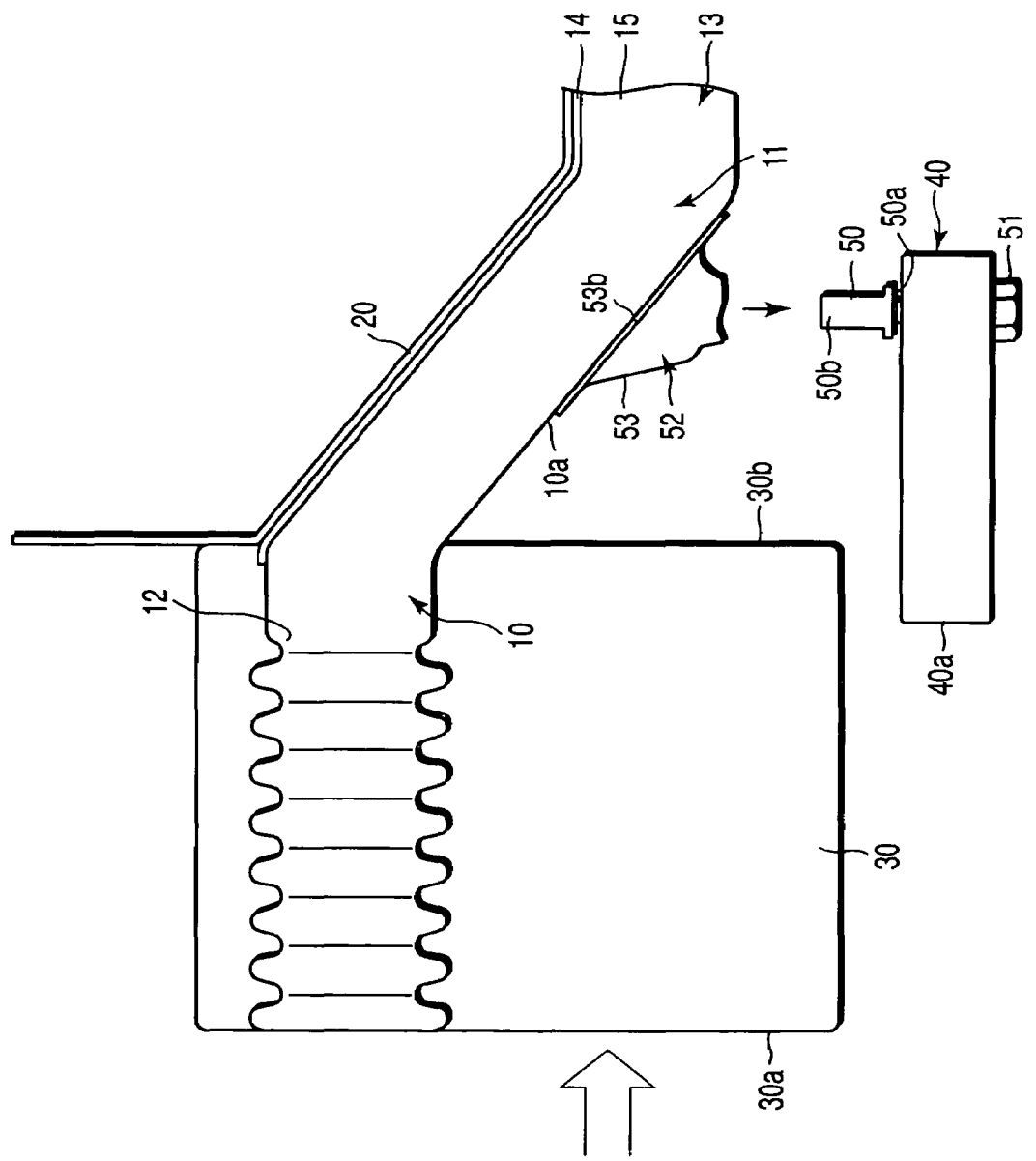
FIG. 7 is a side view illustrating a state in which the cross member drops and the engine is moved behind the cross member.

After the cross member 40 drops down, the engine 30 is further moved backward, and the buckling motion of the side members 10 further continues. The engine 30 is moved until the rear end 30b is brought into contact with the dashboard 20 as shown in FIG. 7. Since thus, the amount of buckling of the front portion 12 is increased, the energy of impact of collision can be sufficiently absorbed.

Figure 8A:
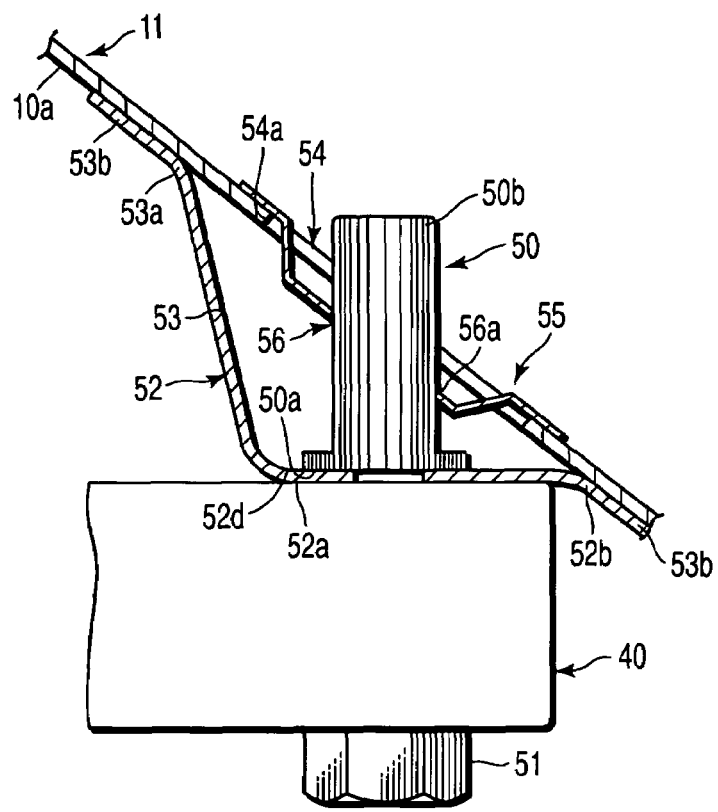
FIG. 8A is a modification of the embodiment, which differs from the structure shown in FIG. 3 in the configuration of a second support plate.
Figure 8B:
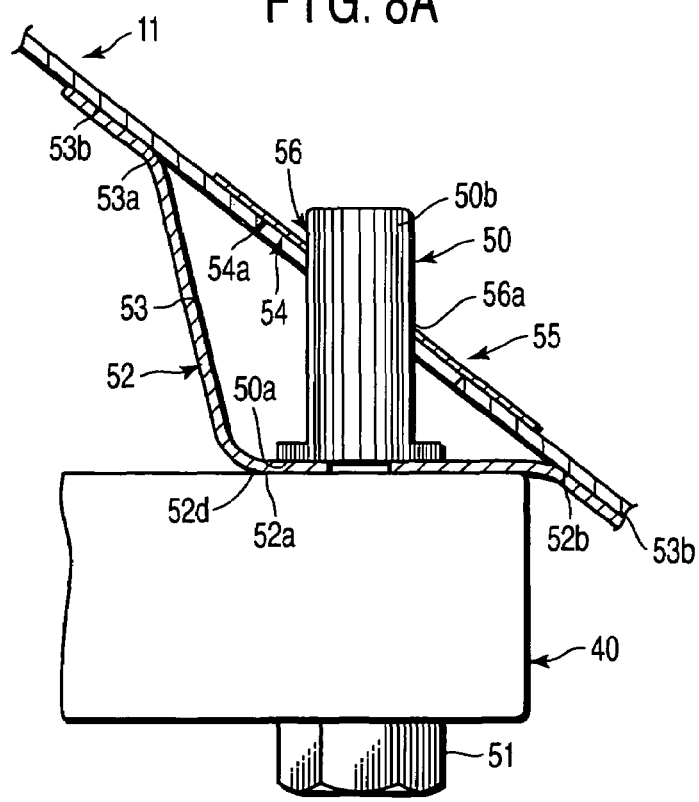
FIG. 8B is another modification of the embodiment, which differs from the structure shown in FIG. 3 in the configuration of the second support plate.

FIGS. 8A and 8B illustrate modifications of the first embodiment shown in FIGS. 2 and 3. These modifications differ from the structure of FIG. 3 in the configuration of the second support plate. In the modification of FIG. 8A, the central portion of the second support plate 55 is hung down below the through hole 54, and secured to the coupling rod 50 under the side plate 10. In the modification of FIG. 8B, the second support plate 55 is a flat plate.

As described above, in the chassis structure of the invention, the main factor of interrupting the buckling motion of the front portion 12 of the side member 10, i.e., the cross member 40, is eliminated by dropping the cross member 40, thereby increasing the energy of impact to be absorbed by the side members 10. This reduces the impact transmitted to the car interior.

Further, the level of the impact that drops the cross member 40 can be adjusted by selecting the configurations and materials of the first and second support plates 52 and 55. This means that the level of the impact can be easily varied in accordance with the type of vehicle.

Furthermore, since the coupling rod 50 is supported at two locations using the first and second support plates 52 and 55, it can be supported in a stable state. Accordingly, the cross member 40 can be attached to the side members 10 so that it can sufficiently withstand running, and can be dropped down without any complex releasing mechanism.

In addition, the use of the reinforcing member 60 that reinforces the angled portion 11b enables an impact exerted on the cross member 40 to be concentrated on the first and second support plates 52 and 55. In other words, the first support plate 52 and coupling rod 50 can be effectively broken, and the cross member 40 can be realizably dropped down.

Also, by virtue of the structure for dropping down both the cross member 40 and coupling rod 50, the coupling rod 50 is prevented from interrupting the buckling motion of the side members 10 even if the side members 10 buckle to the position of the first support plate 52 after the cross member 40 drops down.

Second Embodiment

Figure 9:
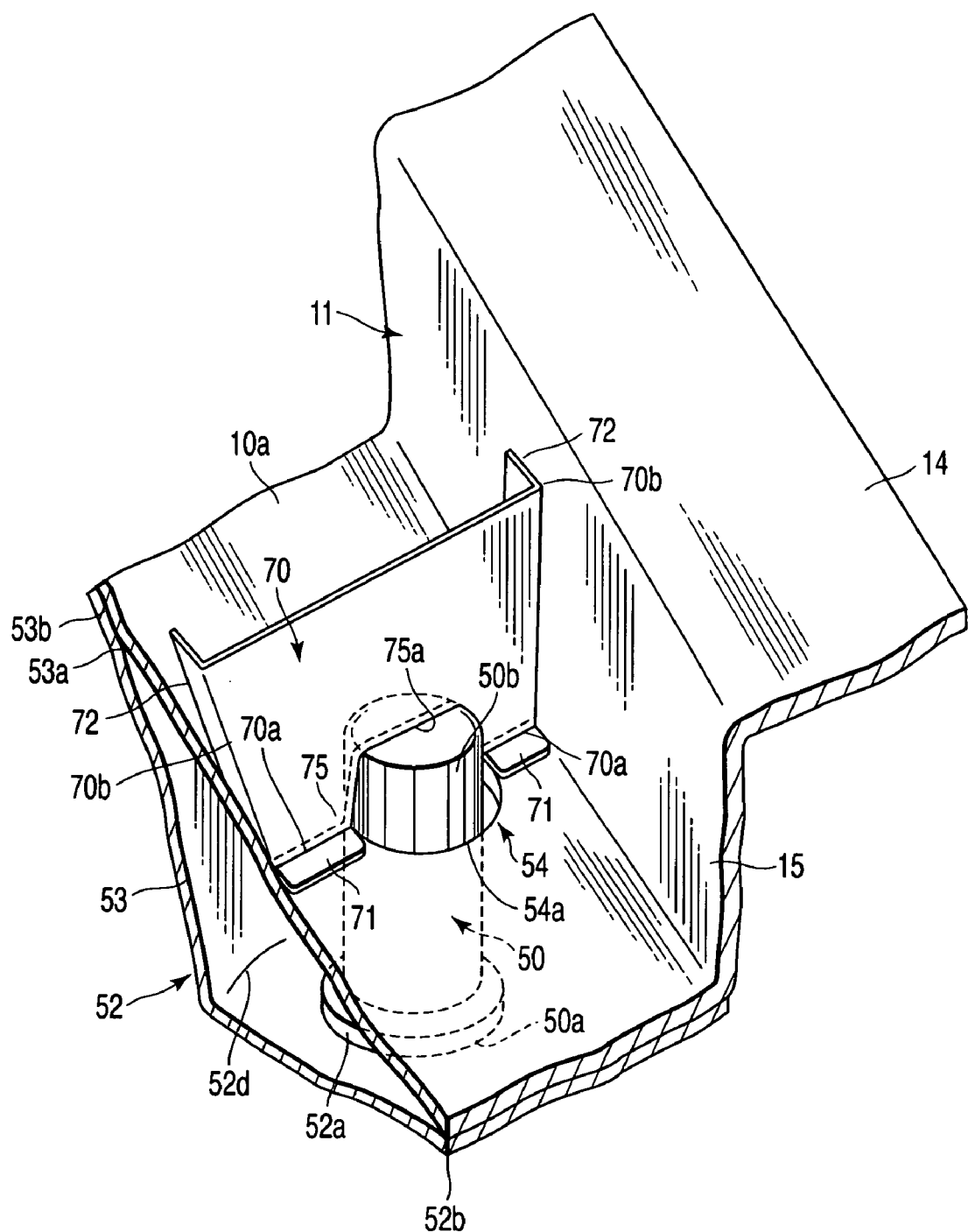
FIG. 9 is a perspective view illustrating part of a chassis structure according to a second embodiment of the invention.

FIG. 9 shows part of a chassis structure according to a second embodiment of the invention. Specifically, FIG. 9 shows a structure in which the coupling rod 50 is supported by a side member 10. The other structures are similar to those of the first embodiment, therefore no description is given thereof. Further, elements similar to those of the first embodiment are denoted by corresponding reference numerals, and are not described.

In the second embodiment, the upper portion 50b of the coupling rod 50 is supported by a second support plate 70 in the shape of a bulk head, as shown in FIG. 9. The second support plate 70 is arranged across the center of the through hole 54 in the width direction of the vehicle body, and is in contact with the upper surface of the bottom 10a of the slanting portion 11 of the side member 10, and with the inner surfaces of the side walls 15 of the side member 10. The lower end 70a of the second support plate 70 includes a flange 71 backwardly extending along the upper surface of the bottom 10a. The respective sides 70b of the second support plate 70 include flanges 72 forwardly extending along the inner surfaces of the respective side walls 15. The flanges 71 and 72 of the second support plate 70 are welded to the bottom 10a and side walls 15, whereby the plate 70 is fixed to the side member 10.

The second support plate 70 also has a lower portion 75 with a recess 75a. The recess 75a receives the upper portion 50b of the coupling rod 50 upwardly projecting from the through hole 54. The upper portion 50b is fixed to the edges of the recess 75a by arc welding, whereby the coupling rod 50 is fixed to the second support plate 70. The second embodiment in which the upper portion 50b of the coupling rod 50 is supported can provide the same advantage as the first embodiment.

In the first and second embodiments, a bolt is inserted from below the cross member 40 to fix the cross member 40 to the coupling rod 50. However, instead of this, a nut may be used to fix the cross member 40 at its bottom. Specifically, a screw section to be inserted through the cross member 40 is provided at the lower end of the coupling rod 50, and a nut is fastened on the tip of the screw section at the bottom of the cross member 40, thereby fixing the cross member 40 to the coupling rod 50.

Further, although in the above-described embodiments, the cross member 40 is fixed to one portion of each side member 10, the invention is not limited to this. For example, the cross member 40 may be fixed to two portions of each side member 10.

In addition, in the above-described embodiments, the cross member 40 located at a front position in the vehicle body is constructed such that it is detached from the side members 10 upon receiving an impact. However, another cross member located at a rear position in the vehicle body may be constructed so. In this case, when the vehicle is bumped from behind, the impact of bumping can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A chassis structure for vehicles comprising:
   a pair of side members extending in a longitudinal direction of a vehicle body along sides of the vehicle body, the side members buckling in the longitudinal direction upon receiving an impact;

a cross member extending between the side members along a width direction of the vehicle body; and a coupling structure which couples the cross member to the side members, the coupling structure permitting the cross member to be detached from the side members when an impact exceeding a predetermined level is exerted on the cross member in the longitudinal direction.

2. The chassis structure according to claim 1, in which the coupling structure comprises:

a coupling rod;

a support unit fixed to each of the side members and supporting the coupling rode; and a fastening tool fixing the cross member to a tip of the coupling rod, said support unit being broken when said impact is exerted on the cross member, thereby releasing the coupling rod and permitting the cross member to be detached from the side members.

3. The chassis structure according to claim 2, in which the support unit comprises:

a first support plate fixed to each of the side members and holding the coupling rod near the cross member, the first support plate being deformed in accordance with a change in an attitude of the coupling rod when said impact is exerted on the cross member, thereby releasing the coupling rod; and a second support plate fixed to each of the side members and holding the coupling rod near said each side member, the second support plate being deformed in accordance with the change in the attitude of the coupling rod when said impact is exerted on the cross member, thereby releasing the coupling rod.

4. The chassis structure according to claim 3, in which:

the coupling rod has an inside screw formed in an end thereof;

the fastening tool is a bolt engaged with the inside screw; and a through hole through which the fastening fool extends is formed in the first support plate, the through hole being forcibly expanded by the coupling rod or the fastening fool when said impact is exerted on the cross member, thereby releasing the coupling rod from the first support plate.

5. The chassis structure according to claim 4, in which the second support plate is fixed to a surface of each of the side members remote from the cross member, the second support plate being broken when said impact is exerted on the cross member, thereby releasing the coupling rod from the second support plate.

6. The chassis structure according to claim 3, in which the second support plate is formed of a more elastically deformable material than a material of the side members.

7. The chassis structure according to claim 5, in which the coupling rod is welded to the second support plate.

8. The chassis structure according to claim 2, further comprising a reinforcing member attached to a surface of each of the side members behind the coupling rod and remote from the cross member, the reinforcing member reinforcing said each side member.

9. The chassis structure according to claim 8, in which:

the side members each have a slanting portion that backwardly lowers; and the cross member is coupled to the side members below the slanting portion.

10. The chassis structure according to claim 9, in which:

the side members each have a horizontal portion extending after the slanting portion; and the reinforcing member reinforces an angled portion extending between the slanting portion and the horizontal portion.

* * * * *